United States Patent [19]

Wulforst

[11] Patent Number: 5,003,405

[45] Date of Patent: Mar. 26, 1991

[54] METHOD AND APPARATUS FOR TRANSMITTING VERIFIED COPY OF A DOCUMENT OVER DISTANCES AND TO SUBSTITUTE FOR ORIGINAL DOCUMENT

[76] Inventor: Howard E. Wulforst, P.O. Box 60160, Reno, Nev. 89506

[21] Appl. No.: 275,938

[22] Filed: Nov. 25, 1988

[51] Int. Cl.⁵ .............................................. H04N 1/00
[52] U.S. Cl. .................................... 358/400; 358/402; 358/405; 241/101.2
[58] Field of Search .......................... 355/133; 178/37; 380/16, 18; 358/400, 401, 402, 405, 407, 408; 241/101.2

[56] References Cited

U.S. PATENT DOCUMENTS

| | | | |
|---|---|---|---|
| 4,007,326 | 2/1977 | Bernsen | 358/280 |
| 4,414,579 | 11/1983 | Dattilo | 358/286 |
| 4,613,907 | 9/1986 | Yoshimoto et al. | 358/257 |

FOREIGN PATENT DOCUMENTS 0215864 12/1983 Japan ..................................... 178/37

OTHER PUBLICATIONS

Washington Daily News; Tuesday Oct. 27, 1959; Electronic Mail Tested, 358-400.

Primary Examiner—Edward L. Coles, Sr.
Assistant Examiner—Jerome Grant, II
Attorney, Agent, or Firm—Herbert C. Schulze

[57] ABSTRACT

A method and apparatus by which an original document in one location may be transmitted by image transmission, facsimile, or the like, to another location, verified as to accuracy, certified as a replacement for the original, and the original then destroyed so that the verified copy becomes, in legal effect, the only original of the document; wherein this is accomplished by placing the original in an enclosed, locked, tamper proof environment from which it is transmitted by image transmission, facsimile, or the like, to a different location in which the copy is maintained in a locked and tamper proof environment; the copy is compared by electronic or optical scanning, or other such arrangement, to the original to verify accuracy; when verified, the copy is coded so as to indicate the only useable, as though the only, original copy of its type and simultaneously the original is automatically destroyed or voided in its locked environment.

2 Claims, 7 Drawing Sheets

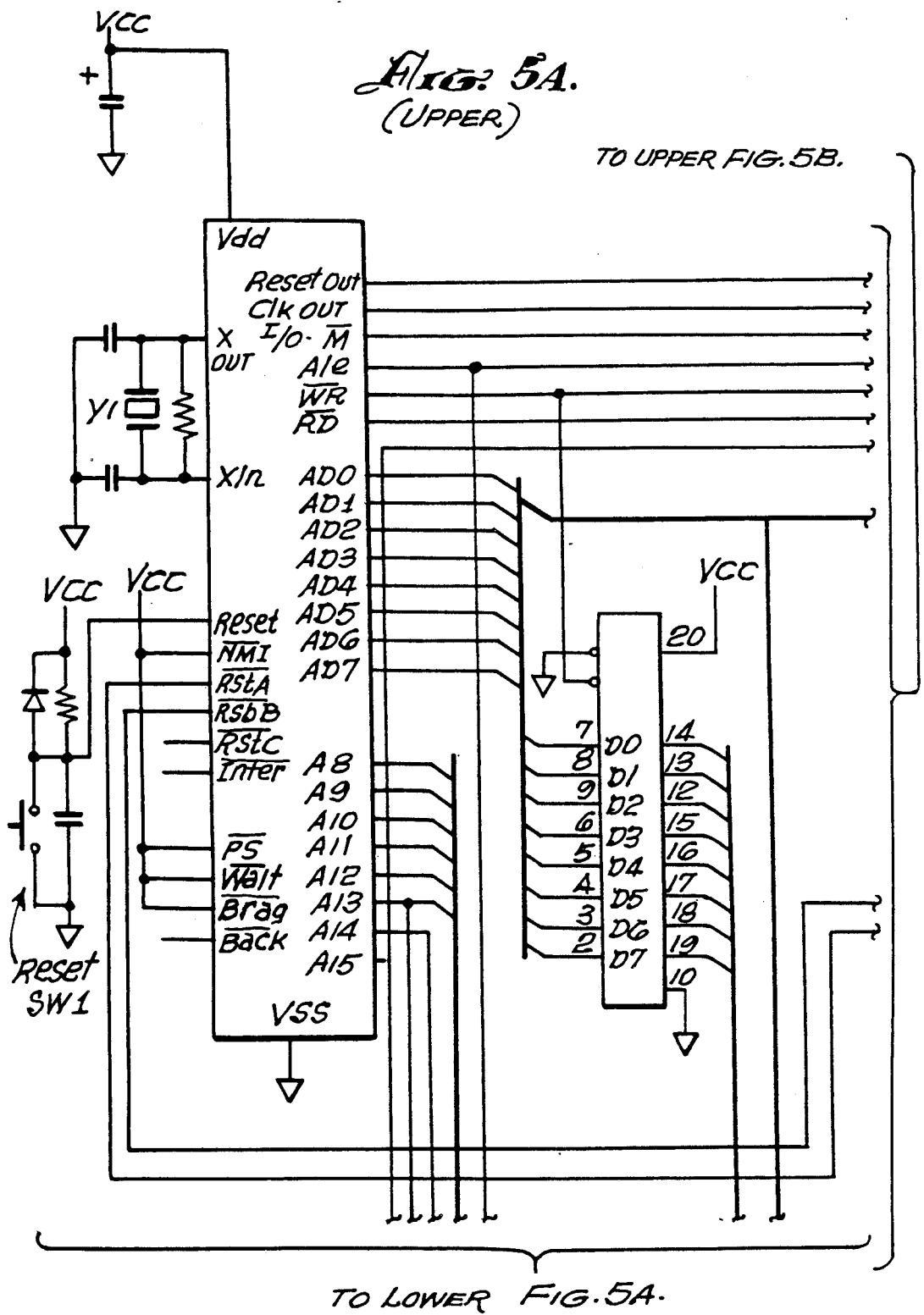

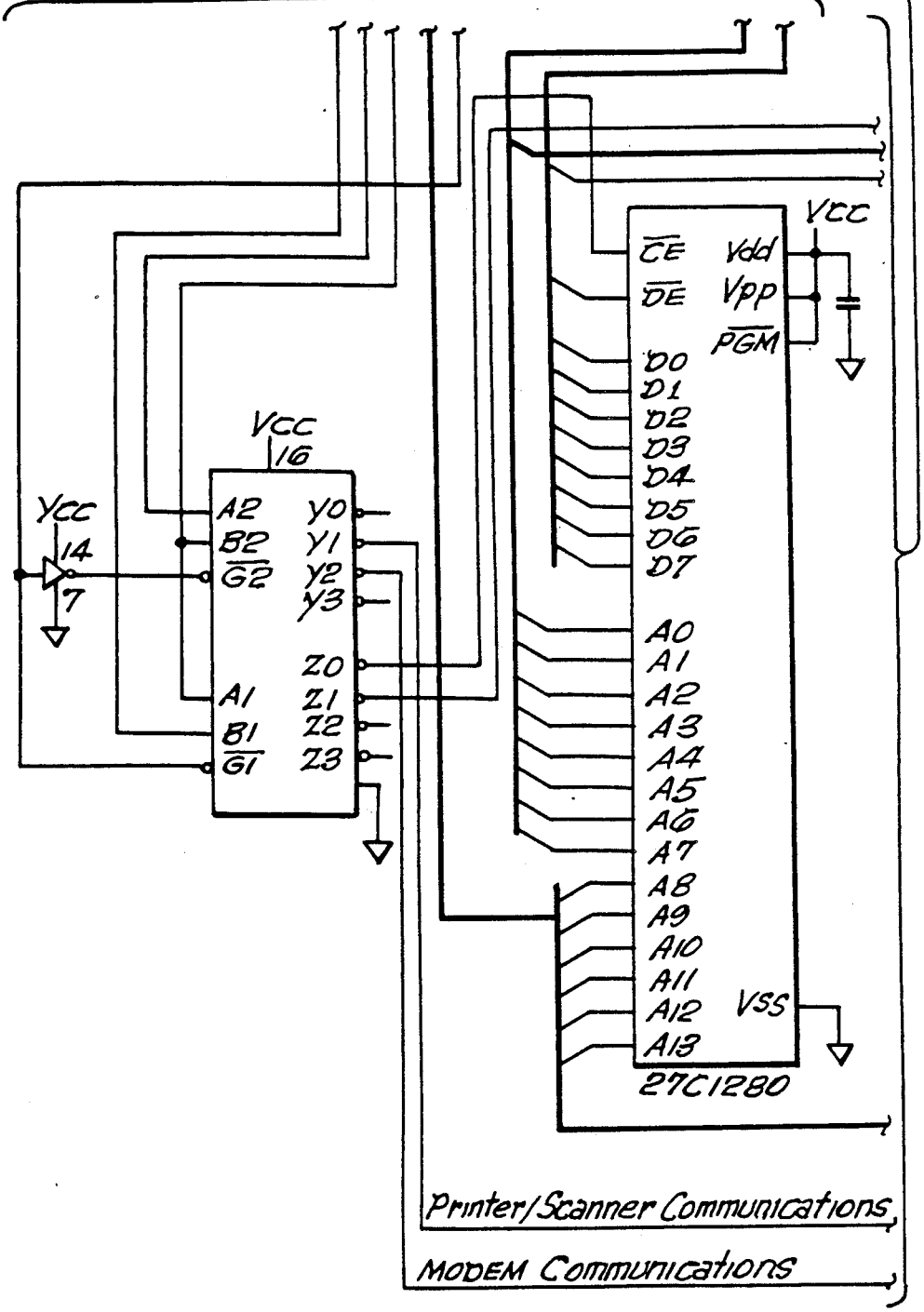

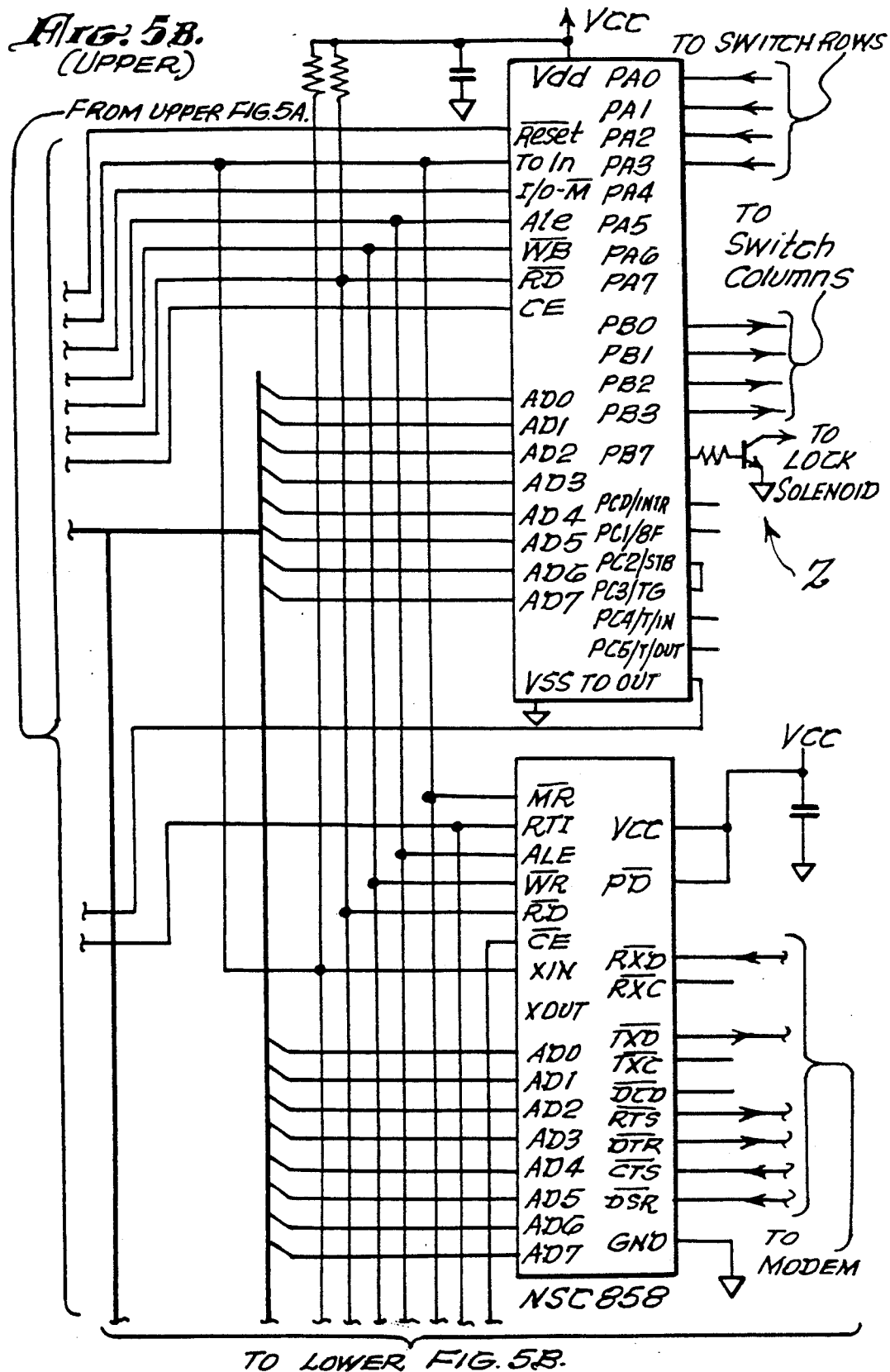

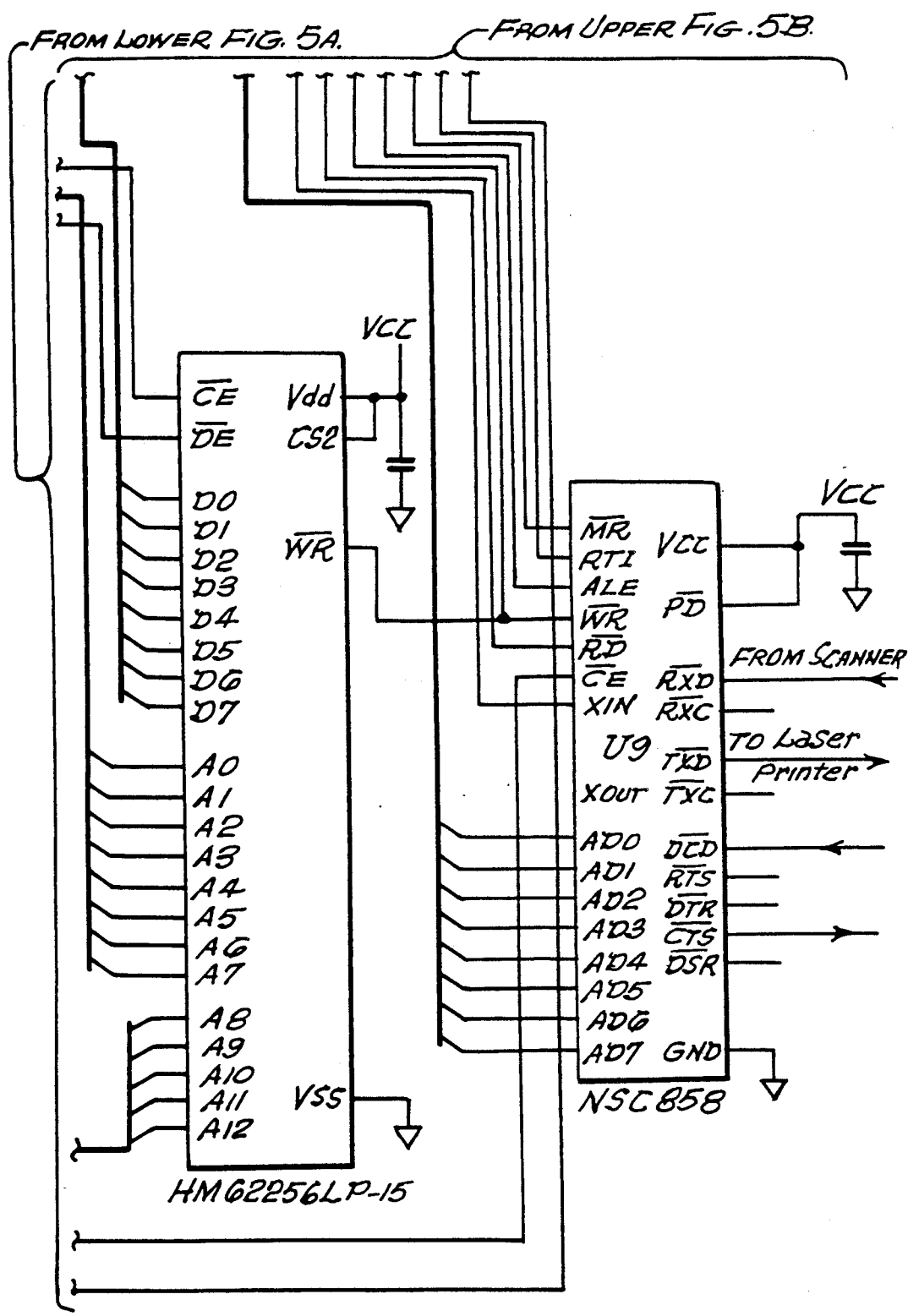

METHOD AND APPARATUS FOR TRANSMITTING VERIFIED COPY OF A DOCUMENT OVER DISTANCES AND TO SUBSTITUTE FOR ORIGINAL DOCUMENT

CROSS REFERENCE TO RELATED PATENT APPLICATIONS

This application is not related to any other patent application filed by me.

BACKGROUND OF THE INVENTION

1. Field of the Invention

This invention is in the general field of copying and verification of documents:

This invention is more particularly directed to a method and apparatus for transmitting a copy of an original document to a location different from the location of the original, wherein the copy is verified as to accuracy;

The invention is further more particularly directed to such a method and apparatus wherein the copy, after verification as to accuracy, is especially coded or marked so as to become the only useable (in lieu of) original;

The invention is still further directed to such a system as herein described wherein the original from which the verified copy has been made is destroyed upon verification of the of the copy.

2. Description of the Prior Art

There is much prior art in the transmitting of documents by means of facsimile transmission, and other types of transmission. However, there is no prior art known to me wherein a copy of an original document is transmitted to a different location from that in which the original is located and wherein upon such transmission the copy is verified and coded to take the place of the original and the original is destroyed so that there is only a copy verified as the only existing document to be used as an original.

SUMMARY OF THE INVENTION

There are many instances wherein it is desirable to have an original of a document immediately available for use in a location other than that in which the original document is located. Copies may be effectively transmitted by facsimile and other transmission means and by high speed image transmission, and the like. However, such copies cannot be used as the original document since there is the danger that the original, and a copy attempted to be used as the original, will end up in different hands and result in confusion, duplication of payments, duplication of record transfers, and the like.

With new regulations concerning the banking industry wherein a bank must credit an account within a limited period of time, and cannot necessarily submit the original of a document authorizing transfer of funds, there is always the danger that without that original, a copy may be used, but the original itself may turn up later in another entity's hands and can result in a loss by double payment.

Likewise it is equally desirable to make almost instant transfers of documents representing ownership of various types of property, such as shares of stock of a corporation, real property, and the like.

Delays in accomplishing transfers of funds based on transactions of the type mentioned, and other transactions, can result in losses by reason of interest loss, dividend loss, and other such losses.

I have studied this problem at length and have now conceived and perfected an economical and practical method and mechanism to solve these problems.

I accomplish my desired goals by use of document transmission means coupled with means to verify accuracy of transmission and to code, or otherwise verify, the existence of the copy as the single original document to be used, together with simultaneous destruction, or voiding, of the original document in its environment at a different location. Thus, there is only one document which can be considered and used as the original.

The manner in which I accomplish the desired goals is to place the original document in a locked and tamper proof environment having means therein to transmit the document as well as means to verify the accuracy of the transmission and to destroy the original upon verification of the accuracy and existence of a properly coded copy to be used in lieu of the original.

The foregoing transmission arrangement is cooperatively functioning with a locked and tamper proof environment wherein the copy is received, encoded with verification medium, compared to the original by optical, or other, transmission. Upon verification, the original is destroyed or voided in its environment, after which the verified copy to be used in lieu of the original is released from its locked and tamper proof environment.

Copy transmission may be by facsimile transmission, electronic image transmission, or the like. Verification of the accuracy of the copy can be by optical, electronic image, or other appropriate comparison. The locked environment of the original can only be accessed when a transmission is totally completed, the original destroyed, and the verified copy coded as verified. At this time the verified copy will be automatically released from its locked environment, at which time the system is available for another similar transmission.

It is an object of this invention to provide a method and apparatus as described wherein a copy of an original document may be transmitted to a location different from that in which the original is located after which the copy will be verified and the original destroyed.

Another object of this invention is to provide such a method and apparatus wherein documents may be swiftly copied with a single copy being marked as the document to take the place of an original and the original destroyed;

Another object of this invention is to provide a method and apparatus as set forth wherein at any given time only one document will serve as the legally enacting document.

The foregoing and other objects and advantages of this invention will become apparent to those skilled in the art upon reading the description of a preferred embodiment which follows, in conjunction with a review of the appended drawings.

BRIEF DESCRIPTION OF THE DRAWINGS

FIG. 5A and 5B detail the circuitry in a manner understandable to those skilled in the art for a mechanism to practice the method of this invention.

DESCRIPTION OF A PREFERRED EMBODIMENT

Figure 1:
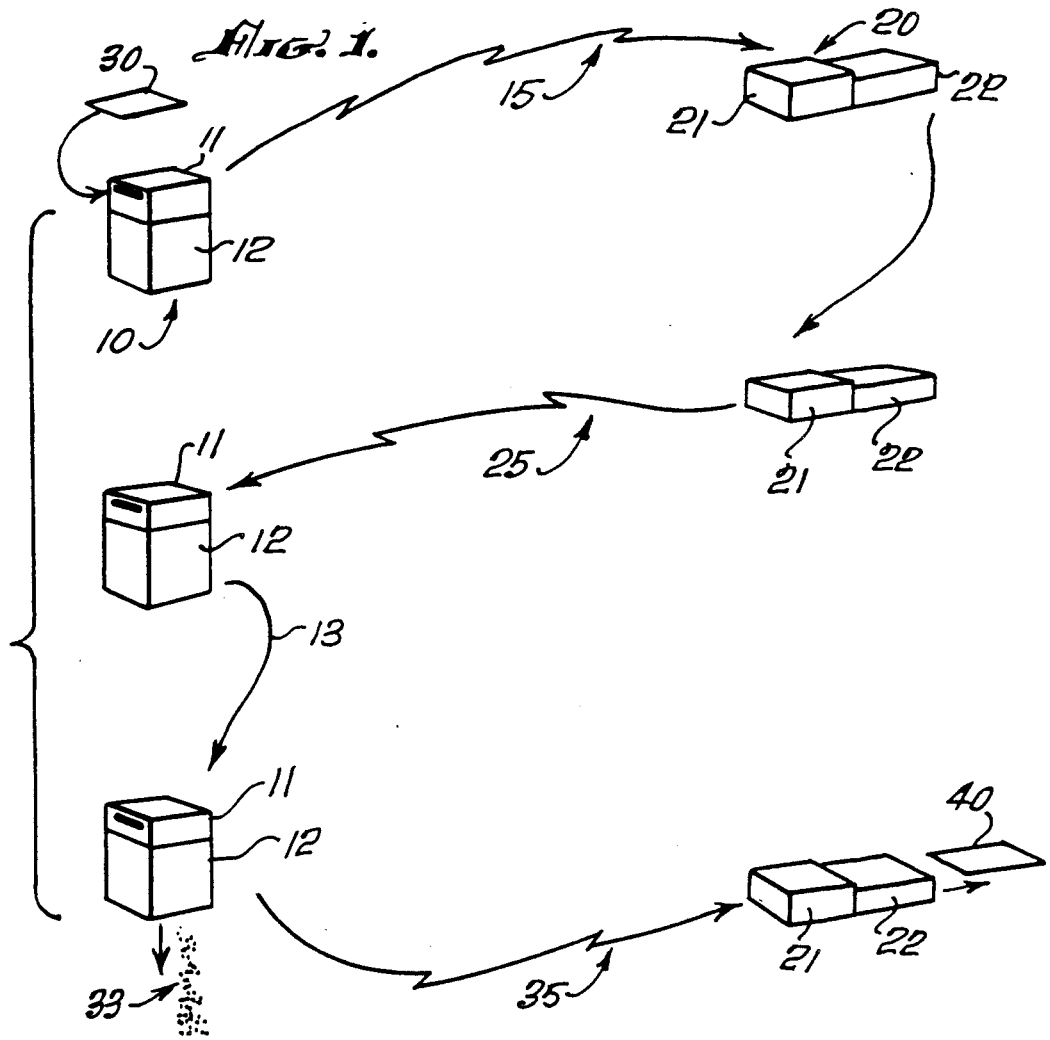
FIG. 1 is a schematic drawing illustrating the entire method of this invention in one form.

One skilled in the art will have no problem understanding the method of this invention and the machinery necessary to put the method into effect. FIG. 1 shows a simple procedure by which this method may be accomplished. In FIG. 1 there is shown generally at 10 a combination of a facsimile machine 11, and a paper shredder 12. FIG. 1 also shows a document 30 to be inserted through a slot. The facsimile machine will be mounted with a solenoid latch (not shown, but understood by those skilled in the art) to the shredder. The facsimile machine 11 then sends by route 15 a copy to a completely enclosed and sealed facsimile machine and document dispensing apparatus generally 20 consisting of the facsimile machine 21 and the document compartment 22.

Continuing with FIG. 1, it is shown that after the document has been received at station 20 it will be retransmitted through route 25 to station 10 where it will be compared to the original by optical scanning, or the like (known to those skilled in the art), to confirm accuracy. When accuracy has been confirmed, the original document 30 will be shredded and expelled as shredded document 33 and a release signal to unlock the solenoid locked document container 22 will be sent back to station 20 and the new document with an authentication stamp (placed thereon by automatic stamping machine, or the like, known to those skilled in the art) and thus becomes the only legally useable document.

Figure 2:
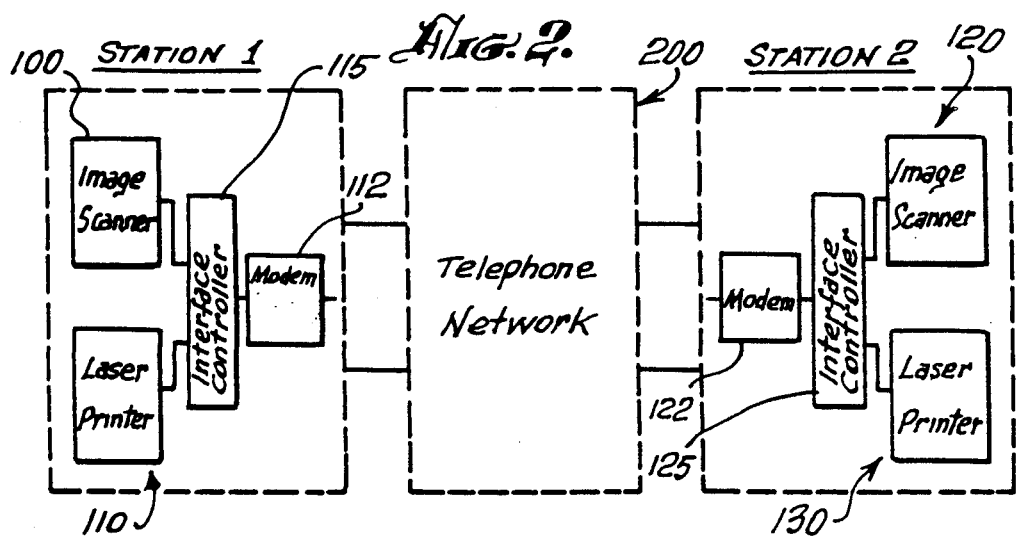
FIG. 2 is a schematic diagram illustrating the method of this invention in an alternative form.

FIG. 2 shows an alternative arrangement wherein image scanners and laser printers are utilized rather than the facsimile arrangement in FIG. 1. It is believed that the image scanning and laser printing arrangement will be faster and less expensive than the facsimile machine system previously described, when in large scale production.

In FIG. 2 it is seen that at station 1 there is an image scanner 100, the laser printer 110, an interface controller 115 and a modem 112 connecting through telephone network 200 in a manner quite familiar to those skilled in the art. At station 2 there is again an image scanner 120, a laser printer 130, an interface controller 125, and modem 122. It will be obvious to those skilled in the art how these items cooperate with each other to transmit from station 1 to station 2.

Figure 3:
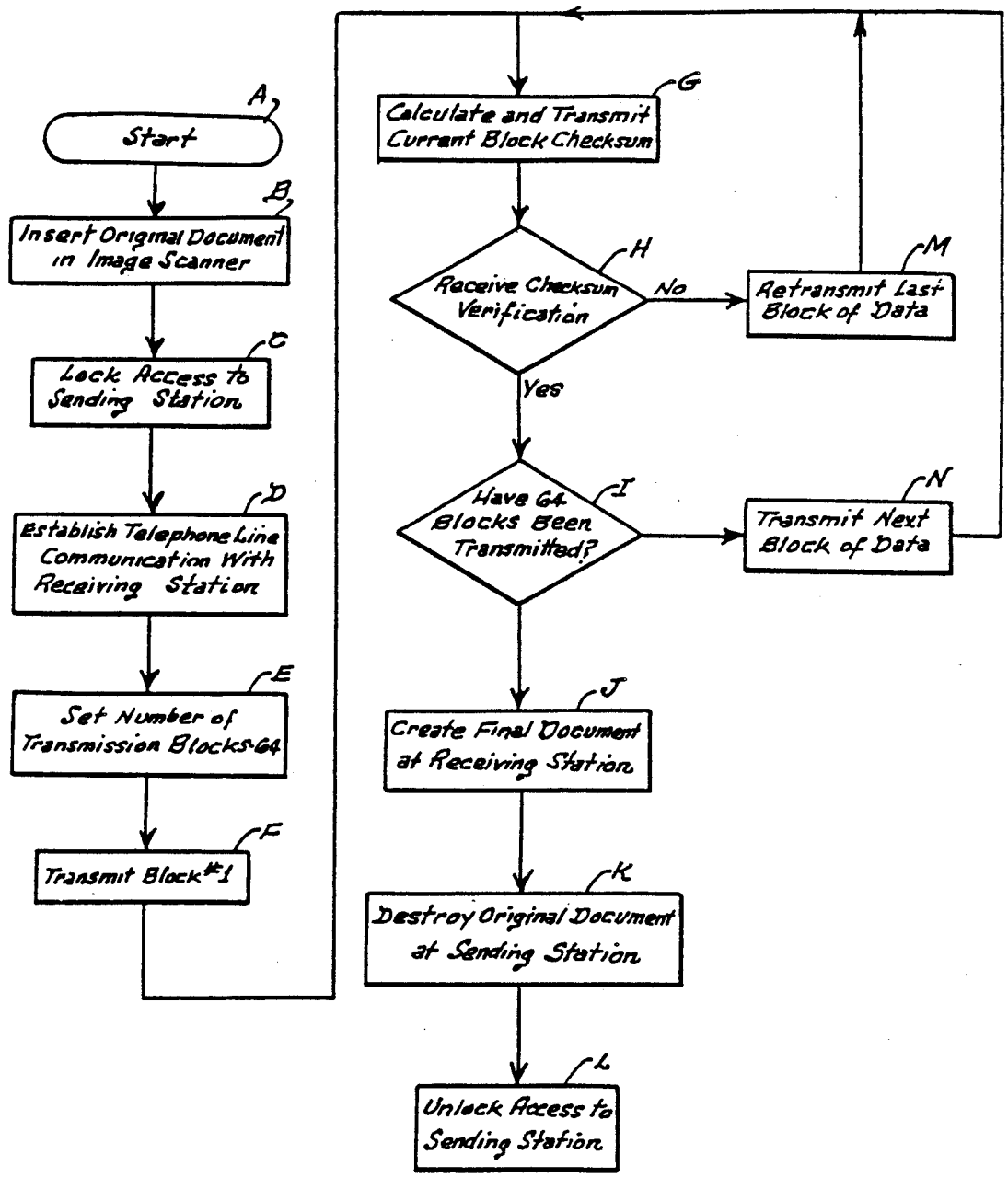
FIG. 3 is a schematic demonstration of a method of this invention in a preferred form.

FIG. 3 breaks down the operations performed by the elements of FIG. 2. It is seen that the starting of the operation at A involves inserting the original document into the image scanner at B the document container is then locked at sending station C and the telephone connection through image scanning controller and modem is established at D. The sixty four transmission blocks are set at E. At F the transmission of block number 1 is instigated.

Thereafter, the calculation and transmission of the block checksum at G is followed by the receiving checksum verification at H. At this point there is a check back for retransmission of the last block of data at M. At 1 the transmission of all 64 blocks is verified. The verification triggers the order to transmit the next block of data at N, following the path indicator. At M, the retransmission of the last block of data is accomplished.

At J the final document is created at the receiving station and the destruction of the original document at the sending station is ordered at K and simultaneously the access to the sending station is unlocked by solenoid activation at L.

Figure 4:
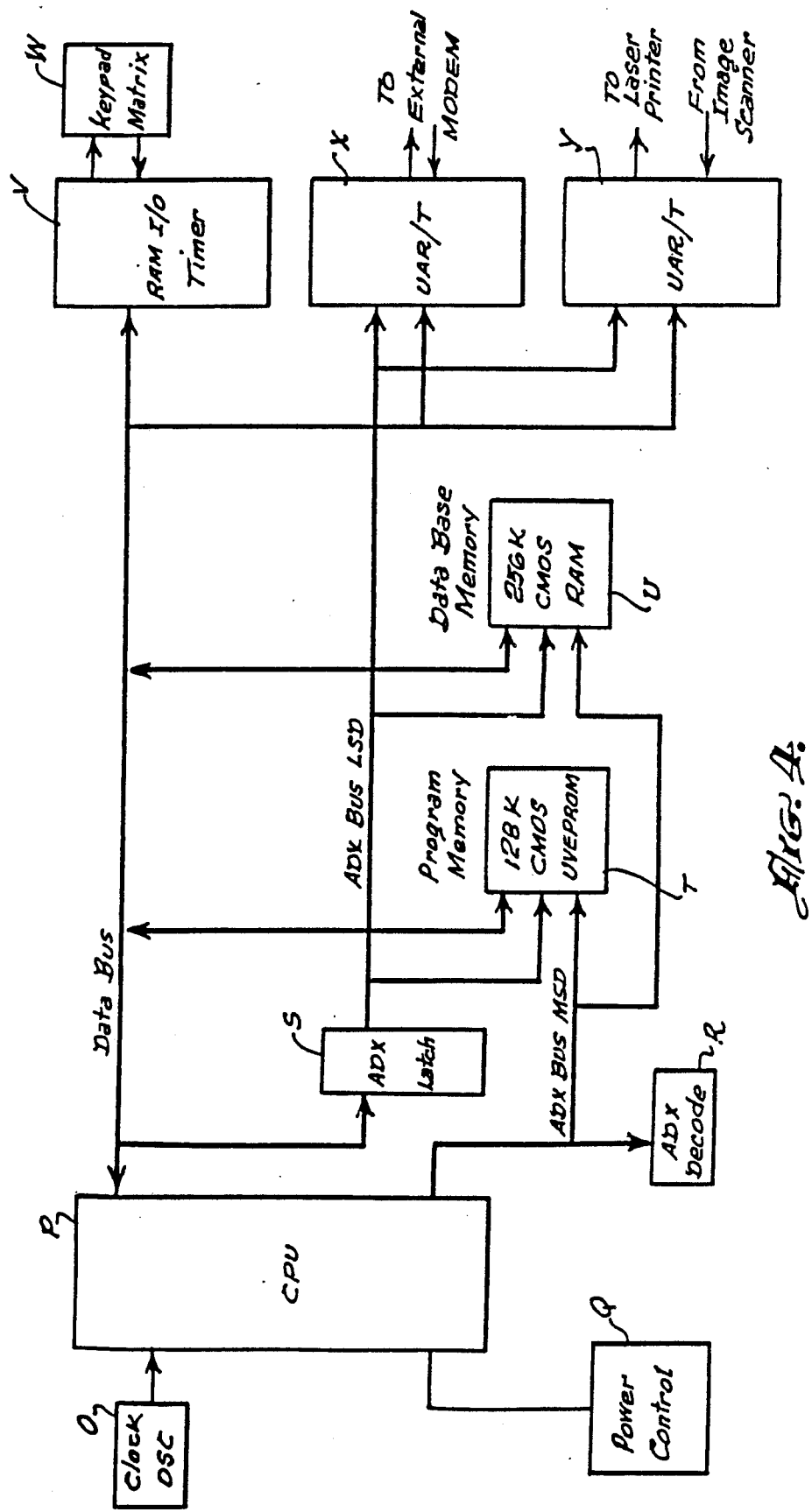
FIG. 4 is a schematic diagram indicating the operative elements of the method set forth in FIG. 3.

FIG. 4 shows the clock OSC at O with the CPU at P. The power control block at Q is shown through the CPU to the decoding at R, and the data bus line is shown with the latch at S on ADX. The ADX is seen together with the program memory and the other elements T with the data base memory at U.

At V the ram input-output timer is shown with the key pad matrix at W. At X the contact to the external modem and at Y is the activation of the laser printer (known to those skilled in the art) and the image scanner.

FIGS. 5A and 5B are completely detailed and will be understood by anyone skilled in the art since the values and other identifications are clearly shown. It would be unduly lengthy to repeat in this description each of the elements since those skilled in the art will have no problem with this decoding.

It should be understood that the diagrams indicate a complete system including importantly at Z on FIG. 5B the lock solenoid positions. The specifications include an image resolution of 300 dots per inch, a transmission rate of 9600 baud with 64 blocks and a checksum of 16 bits (for error checking) with an average document speed of 1 to 2 minutes.

Having thus described the system as it may be utilized in two different forms, it is to be understood that conceivably a means utilizing the elements of my method might be devised. However, it is not my intention to be limited by these foregoing descriptions. Any limitations which may be placed upon this application shall be judged by the doctrine of equivalency and shall not be limited by the specific elements set forth, but only by the scope of the claims which follow.

I claim:

1. The method of providing a single, legally usable, original in place of an actual original of a document comprising: 1, inserting an original document into a locked transmission apparatus at a first location; 2, transmitting an image of said original document to a second location remote from the first location; 3, preparing an original replacement copy of said original document from said image at said second location in a locked environment; 4, verifying that said copy in said locked environment is a true copy of the original; 5, upon verification of the accuracy of the copy in the locked environment destroying the original document within its locked environment; 6, marking the copy to indicate it is the original replacement document; and 7, releasing said copy from its locked environment.

2. Apparatus for transmitting, and verifying, a document to be used in lieu of an original document comprising: means to receive and hold an original document in a first locked environment; means to transmit a copy of said original document into a second locked environment in a location remote from said first locked environment; means to print a copy of said original document at said remote location; means to verify the accuracy of the document copy with the original document; means upon the verification of the accuracy of the transmitted copy to destroy the original document in its locked environment; means to mark copy in said locked environment as the original replacement copy; and means to release said authenticated copy from its locked environment.

* * * * *